July 25, 1967

H. H. RELLER 3,332,403

ROTARY INTERNAL COMBUSTION ENGINE

Filed June 4, 1964

Inventor
HERMAN H. RELLER
By Flynn, Mox & Jangrathen
Attorney

Inventor
HERMAN H. RELLER

July 25, 1967  H. H. RELLER  3,332,403
ROTARY INTERNAL COMBUSTION ENGINE
Filed June 4, 1964  13 Sheets-Sheet 4

Inventor
HERMAN H. RELLER
By Flynn, Mara & Jangarathis
Attorney

Inventor
HERMAN H. RELLER
By [signature]
Attorney

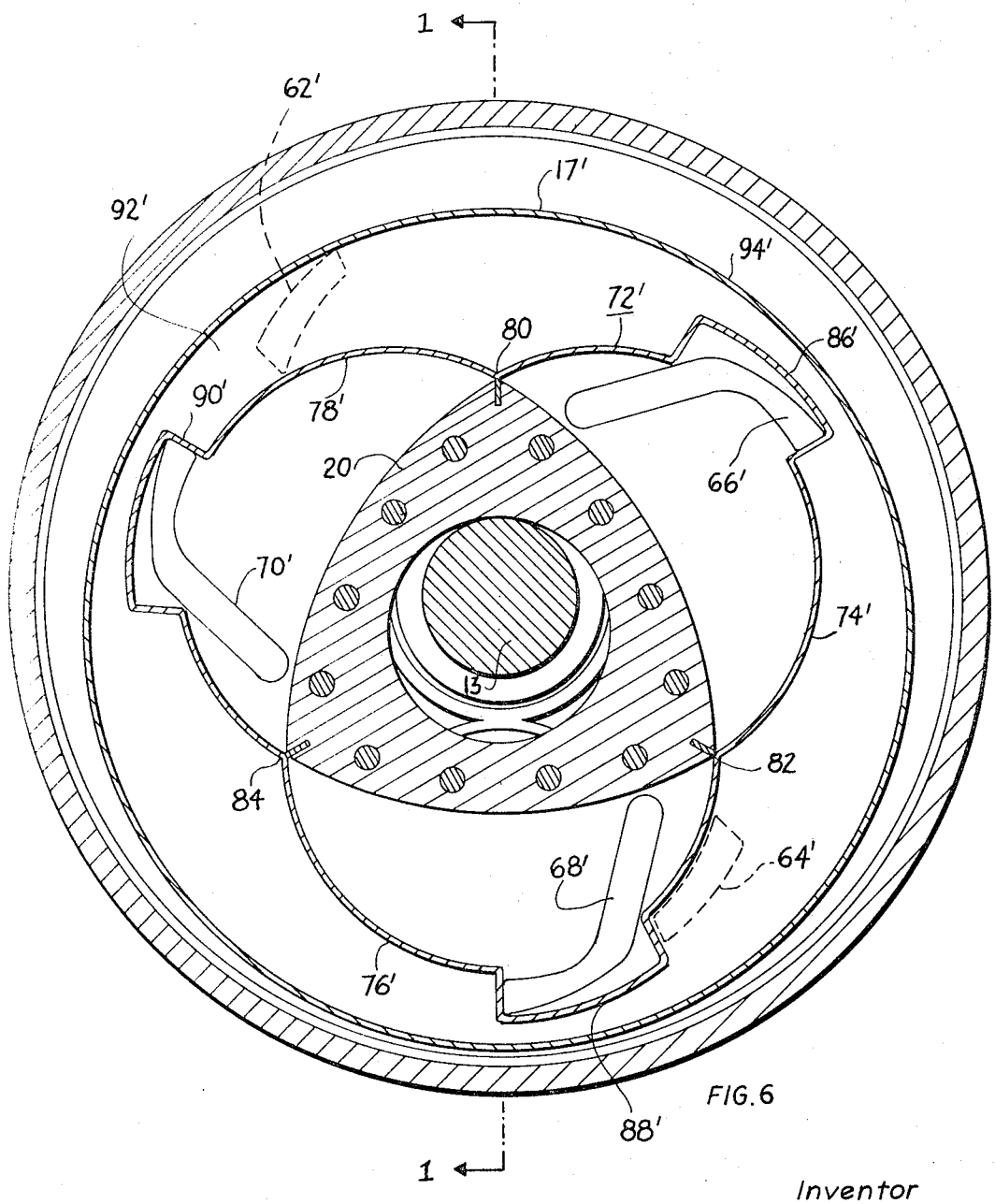

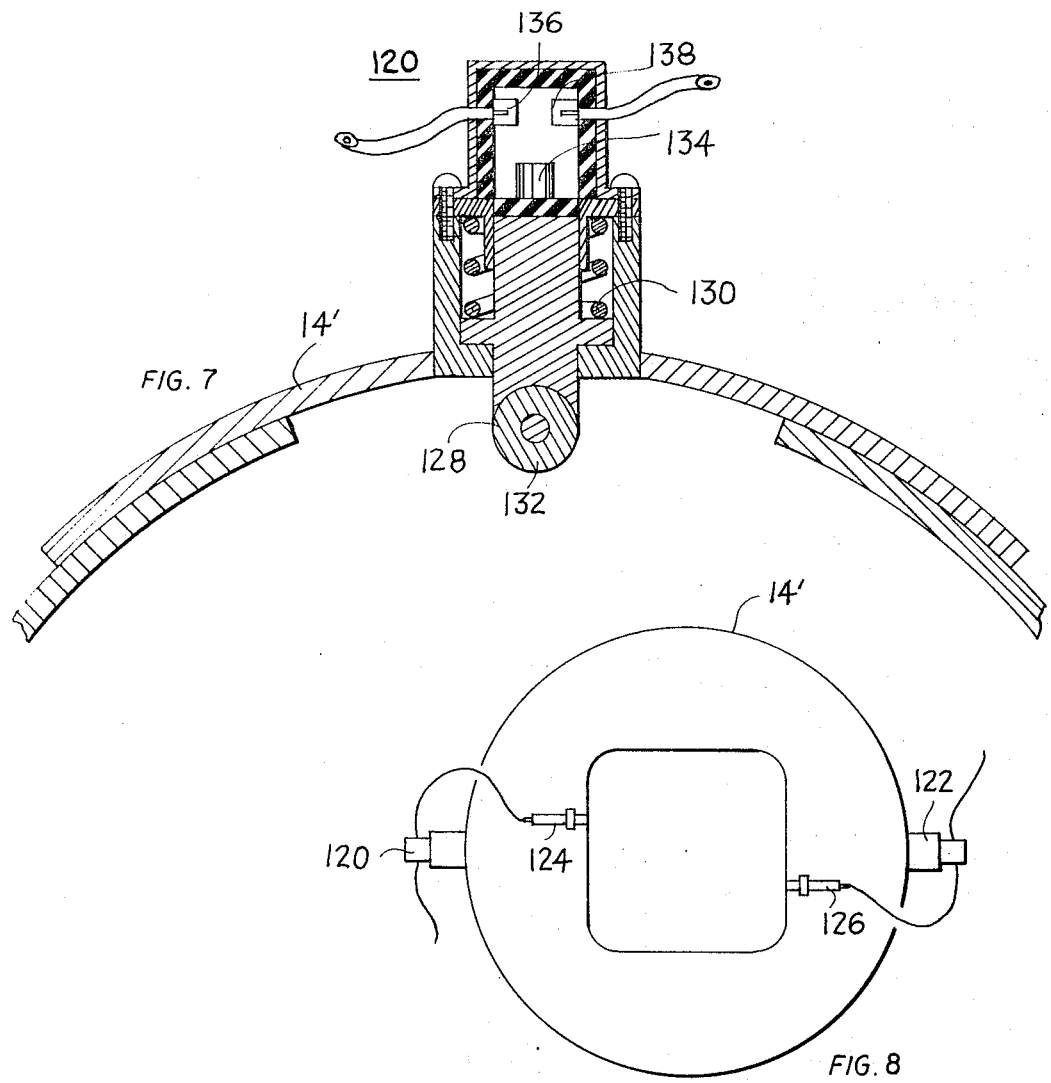

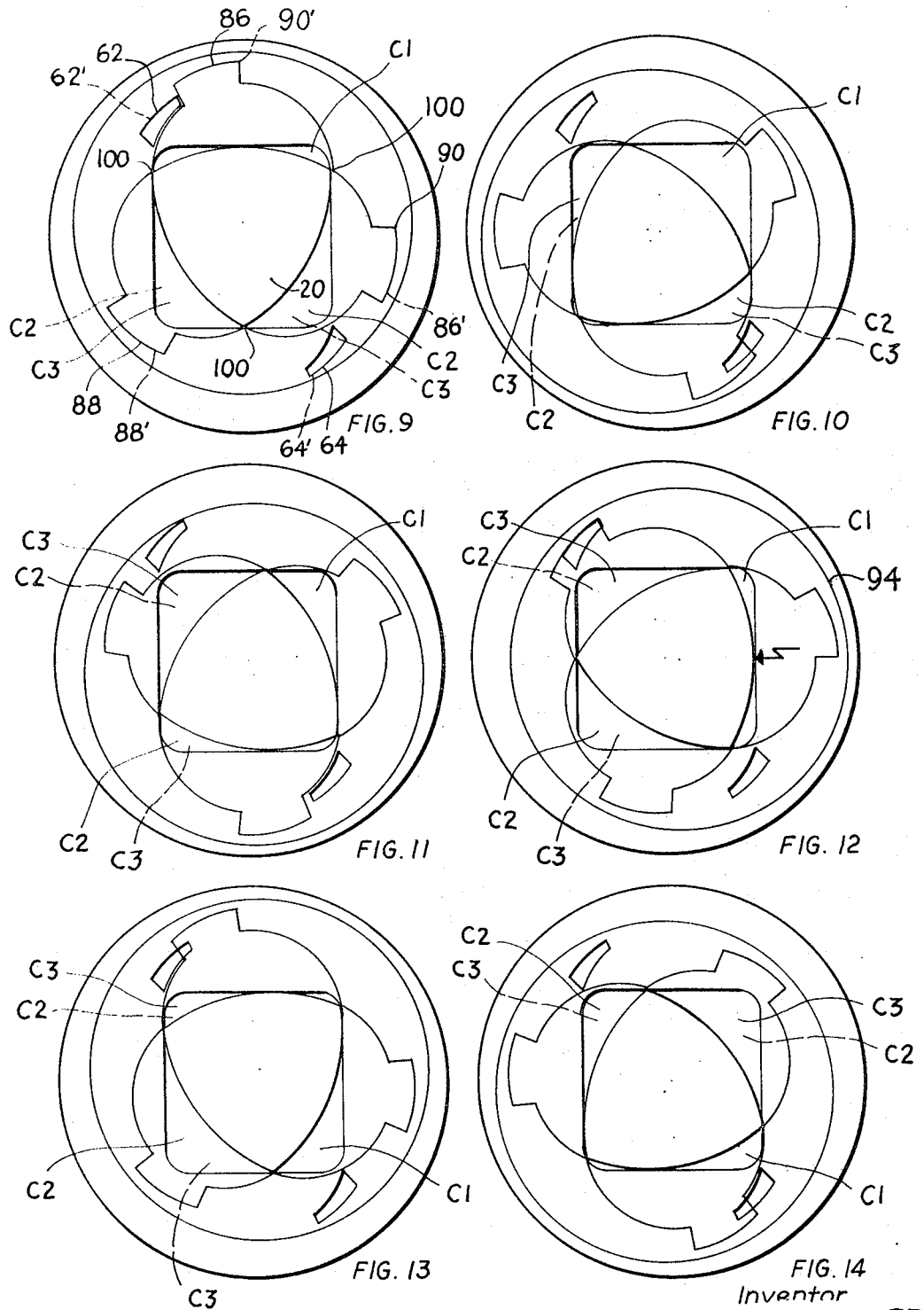

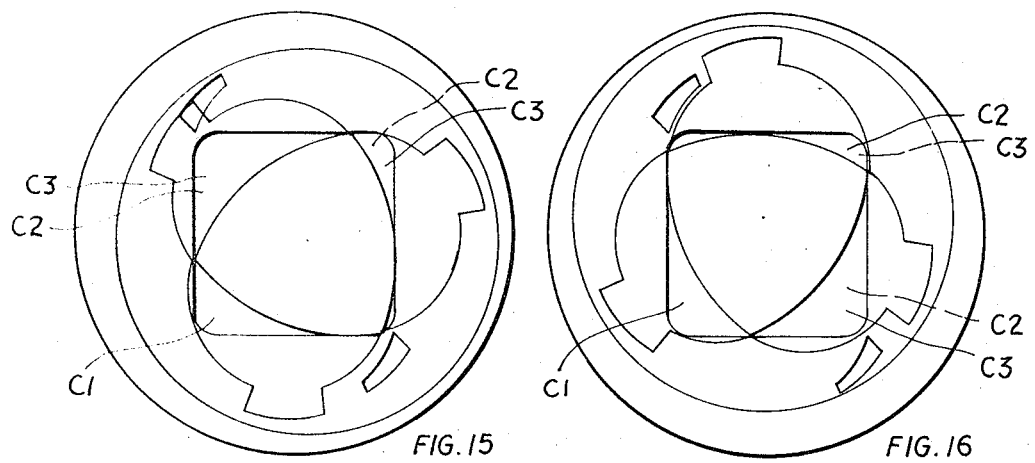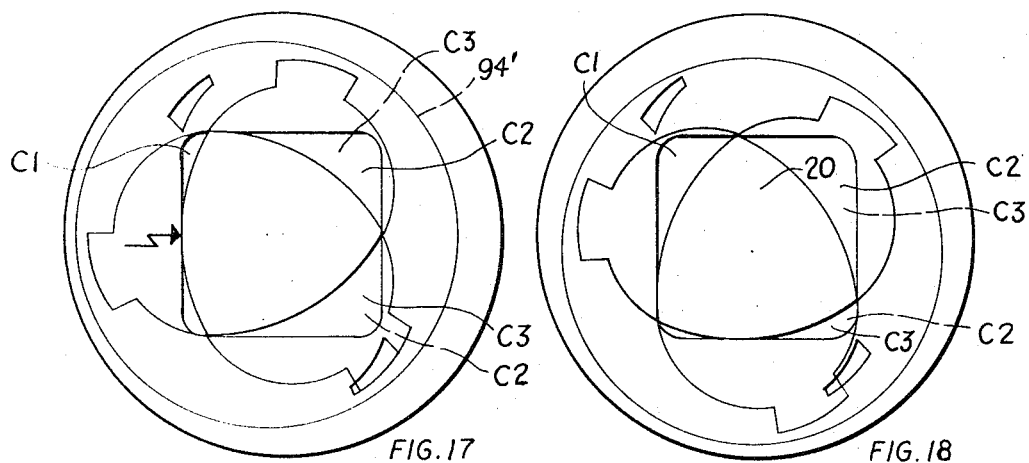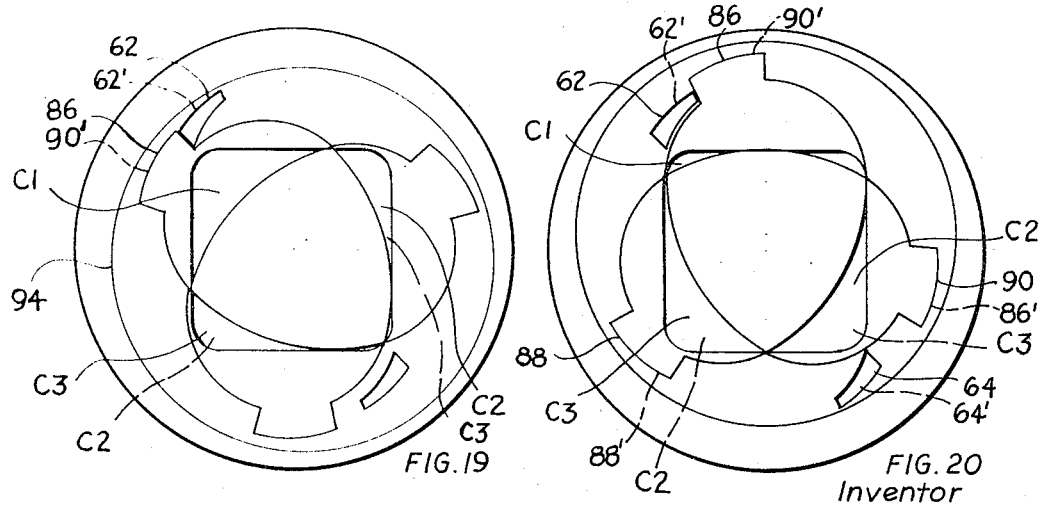

Inventor
HERMAN H. RELLER

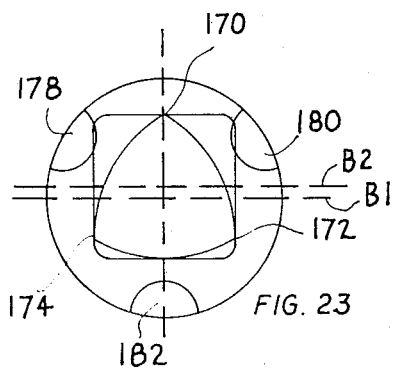
FIG. 23
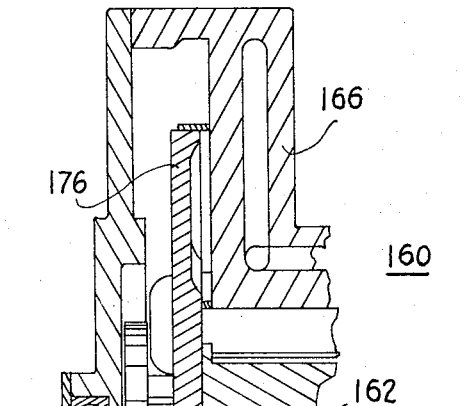
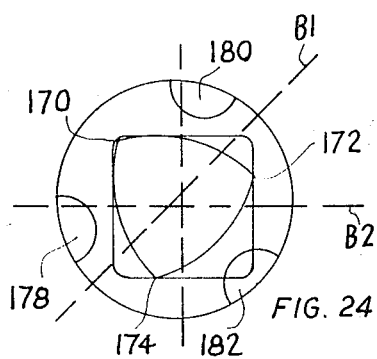
FIG. 24
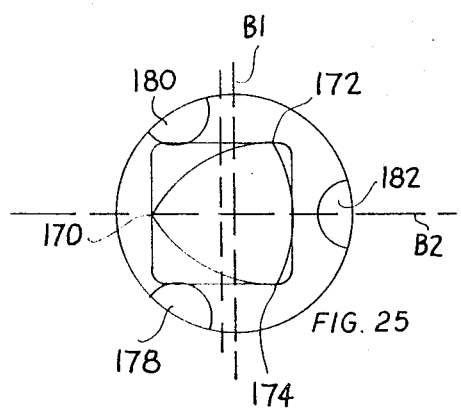
FIG. 25
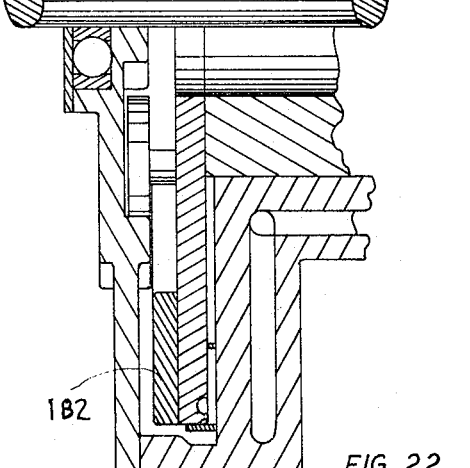
FIG. 22

Inventor
HERMAN H. RELLER

July 25, 1967  H. H. RELLER  3,332,403
ROTARY INTERNAL COMBUSTION ENGINE
Filed June 4, 1964  13 Sheets-Sheet 13

Inventor
HERMAN H. RELLER
By Flynn, Thiele & Boutell
Attorney

United States Patent Office 3,332,403
Patented July 25, 1967

3,332,403
ROTARY INTERNAL COMBUSTION ENGINE
Herman H. Reller, 102—40 67th Road,
Forest Hills, N.Y. 11375
Filed June 4, 1964, Ser. No. 372,460
10 Claims. (Cl. 123—8)

ABSTRACT OF THE DISCLOSURE

This disclosure describes a novel four-stage cycle rotary internal combustion engine wherein a plurality of combustion initiators and uniquely located sets of intake and exhaust passages cooperate with outer and inner engine components to provide for greater engine efficiency and a high combustion rate per engine revolution. Further disclosed are novel counterbalance structure and novel valving structure for engines of this type, as well as a novel structure for supporting the inner engine component for eccentric rotation within the outer engine component.

In the past, conventional internal combustion engines have utilized cylinders, pistons, valves, connecting rods, etc. which mechanical parts cannot withstand long use without wear, and which parts absorb energy thus wasting the power of the engine and producing a more inefficient engine.

In recent times, one solution to this problem has been the rotary engine of the type utilizing an outer body in the form of either a 2-lobed or 3-lobed epitrochoid of the type traced by a point on the diameter of a circle rolling on the outside of a fixed circle lying within the rolling circle and with the inner body having a shape approximately the inner envelope of the projections of said epitrochoid on a transverse plane integral with the inner body in all the successive positions of the two bodies as they undergo relative movement as determined by the eccentricities of the axes of the inner and outer bodies. However, this type of rotary engine will provide only that number of power cycles determined by the number of lobes on the inner component.

It is the general object of this invention to provide a new and improved rotary internal combustion engine of the type including an outer component having a peripheral wall parallel to the axis of the engine that defines an inner chamber and an inner component having a peripheral wall mounted within the chamber, with the facing peripheral walls of the inner and outer components being shaped to define upon suitable relative rotation a plurality of variable volume chambers within the outer component with the peripheral wall of the outer component having one more side than the peripheral wall of the inner component.

Another object of this invention is the provision of a new and improved rotary internal combustion engine of the type in which the cooperating shapes of the inner peripheral wall of the outer component and the outer peripheral wall of the inner component are constructed to provide for maximum utilization of the internal volume of the outer component.

Still another object of this invention is the provision of a new and improved rotary internal combustion engine of the type in which the cooperating shapes of the inner peripheral wall of the outer component and the outer peripheral wall of the inner component define upon suitable relative rotation a plurality of variable volume chambers within the outer component in which the number of power strokes per rotation of the inner component is a multiple of the number of sides of the inner component.

A further object of this invention is the provision of a rotary internal combustion engine in which an inner component is suspended within a hollow outer component for relative rotation with respect thereto about an axis eccentric of and parallel to the axis of the outlet component, the inner component having a continuous outer peripheral wall including a plurality of apex portions symmetrically spaced circumferentially about the axis of the inner component with each apex portion incorporating an edge surface parallel to the axis of the inner component for engagement with the inner peripheral wall of the outer component, the inner peripheral wall of the outer component having one more side in number than the number of apex portions of the inner component, one of the components having effective intake passage means therein communicating with the space between the exterior of the inner component and the interior of the outer component for consecutively feeding all of the variable volume chambers therein defined during relative rotation of the bodies, there being that number of intake passages equal to one half of the number of sides of the inner peripheral wall of the outer component, there being provided means for feeding air and fuel to said intake passage means, and the outer component having outlet ports equal in number to said intake passage means communicating with the space between the components, whereby when the components move relative to one another in a manner determined by the number of apex portions relative to the number of sides of the inner peripheral wall of the outer component, the occurrence of the events making up the cycle of operation of the engine is effected solely by the relative movement of the inner component with respect to the outer component.

Another object of this invention is the provision of a symmetrical rotor inner component with a number of apex portions which can be rotated inside a symmetrical wall of a hollow outer component polygonal in shape which has one more side than the apex portions while at all times all apex portions maintain contact with the wall of the outer component.

It is a further particular object of the present invention to provide a pair of orbital valve plates identically formed, each fastened directly to the ends of an inner rotor or component with both plates facing inward, each plate having suitable sealing strips shaped in the form of lobes extending between adjacent apexes of the inner component with each lobe having a further outline to communicate with port holes in flange ends of a hollow outer component upon relative rotation of the rotor and the orbital valve plates to allow one orbital valve plate to intake the gases for each chamber defined by the space between the outer and inner components successively while the orbital valve plate opposite the intake orbital valve plate is in an oppositely disposed position and rotating in the same direction to exhaust its chambers successively at both ports in the flange end face of the outer component after they have completed their expansion cycle.

Another object of the present invention is the provision of a new and better orbital valve plate arrangement of the type discussed above in which a secondary sealing strip is provided to keep the intake and exhaust ports on their respective sides of the inner component from allowing gases within the periphery of the secondary sealing strip from escaping into other parts of the engine and allowing partially exposed ports to communicate with the other port on their respective sides.

Still another object of the invention is the provision of a rotary internal combustion engine with means to suspend the inner component within the outer component and means to maintain gas pressures within the chambers thereby allowing even wear of the outer component.

Another object of the invention is the provision of a new and better rotary internal combustion engine in which the inner component is suspended by the same number of bearings as the number of apex portions of the inner component and travels in a fixed track relative to the polygon shape of the inner peripheral wall of the outer component.

Consistent with the foregoing object, it is an additional object to provide the bearings on the inner component connected in an out of phase position to allow the firing of the chambers so as to utilize the maximum movement of the inner component during the expansion cycle.

Further, consistent with the foregoing objects, by suspending the inner component with respect to the outer walls of the engine, the present invention allows the shaping of the outer peripheral wall of the inner component within the maximum area to permit passage of gases from one lobe to another when the chambers are in the minimum area of compression and to create the most effective turbulence of the gases when igniting or using fuel injection.

A still further object of the invention is the provision of a new and better rotary internal combustion engine, having an inner component on an axis eccentric with respect to the axis of the outer component, in which there is provided mechanical means for counter balancing the weight of the inner component in its eccentric rotation and the eccentric rotation of the orbital valve plate connected to the inner component by extending a lip on the edge of the orbital valve plate parallel to the axis of the shaft and by placing a frame on the shaft using the shaft as a fulcrum and placing the counter weight on the short radius side of the shaft and putting it in contact with the protruding lip of the orbital valve plate so that the motion of the eccentric action will push the counter weight three times faster than the rotor in the opposite direction to the rotation of the rotor.

Additionally, another object of the present invention is a means of counter balancing the rotor by fixing counter weights of the inner component directly to the orbital valve plates at points inverse to the position of the apex points of the inner component.

A still further object of the present invention is the elimination of a standard distributor by providing a positive distribution system for the ignition of the engine in a manner which is controlled by the rotation of the inner component.

Other objects will appear hereinafter.

For the purpose of illustrating the invention, there are shown in the drawings forms which are presently preferred; it is understood, however, that this invention is not limited to the precise arrangements and instrumentalities shown.

FIGURE 6 is a cross sectional view of the intake end of the rotary internal combustion engine similar to the view of FIGURE 4.

FIGURE 7 is a cross sectional view of the spark plug ignition apparatus of the present invention.

FIGURE 8 is a schematic showing the operation of the spark plug apparatus of FIGURE 7.

FIGURES 9–20 are diagrammatic showings of the operation of the rotary internal combustion engine of FIGURES 1–8 as seen from a view similar to FIGURE 4. FIGURES 20–9, as noted with dotted lines, are the showings of the operation of the apparatus of FIGURES 1–8 from the intake side similar to the view of FIGURE 6.

FIGURE 22 is a cross sectional view of a third embodiment of the present invention utilizing a different type of counter balance arrangement.

FIGURES 23–25 are diagrammatic showings of the counter balance arrangement of FIGURE 22.

Figure 1:
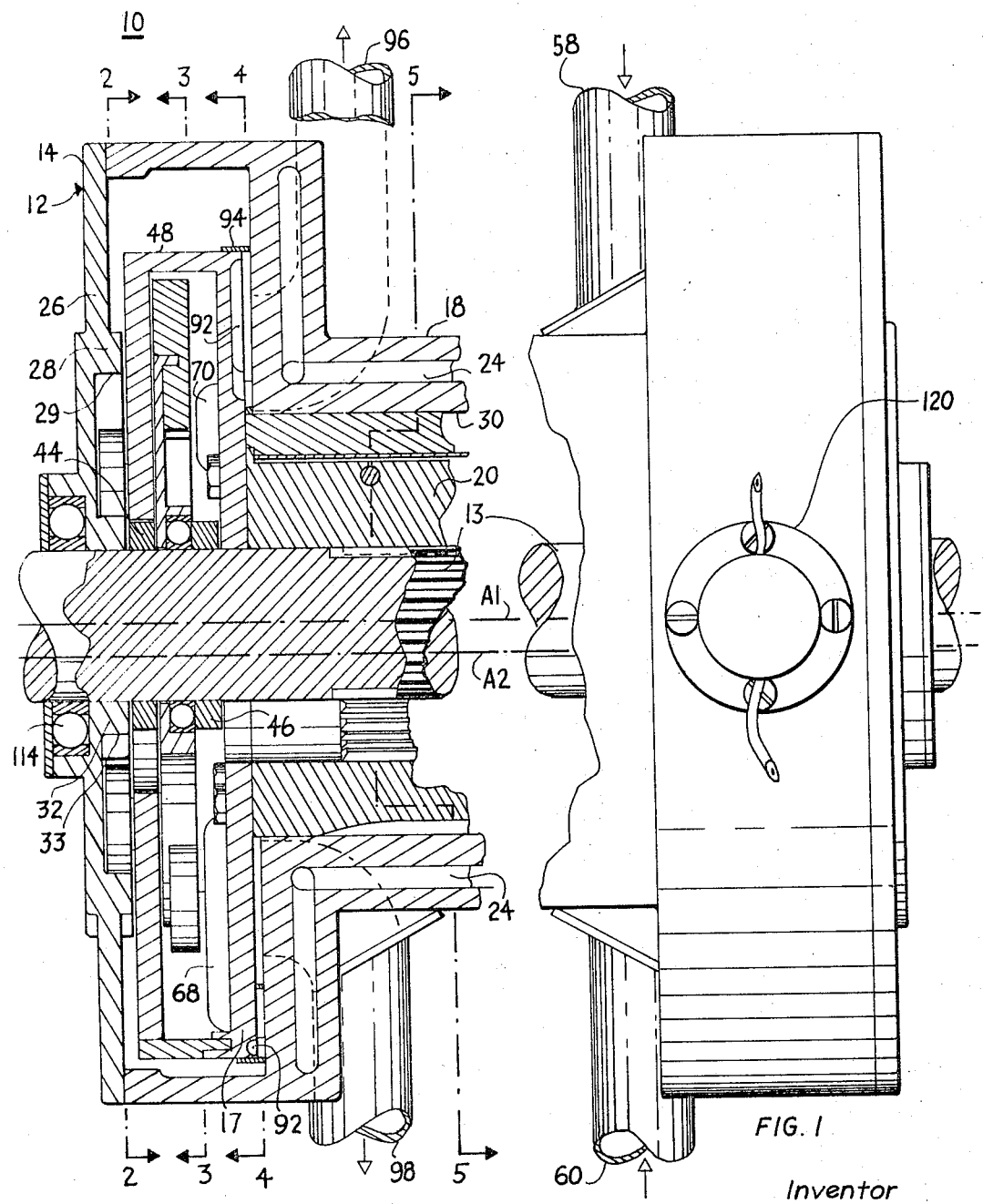
FIGURE 1 is a cross sectional view of the exhaust end of the rotary internal combustion engine of the present invention taken along lines 1—1 of FIGURES 2, 3, 4, 5, and 6.

In FIGURES 1–6, the rotary internal combustion engine of the present invention is shown and is generally designated by the numeral 10. The engine 10 includes a fixed outer housing or component 12 through which passes a shaft 13 having an axis A1, and within which is positioned a rotor or inner component 20 adapted to rotate about an axis A2 parallel to and spaced from axis A1.

Outer housing 12 includes enlarged cylindrical end portions 14 and 14' within which are mounted orbital valve plates 17 and 17' for rotation about axis A2. Centrally of the end portions 14 and 14' there is provided a rotor housing 18 within which is mounted the rotor or inner component 20. The outer housing 12 is cooled by reason of a coolant such as water which is fed through coolant passageways 24 to maintain the engine operating temperature at a desired value.

Figure 2:
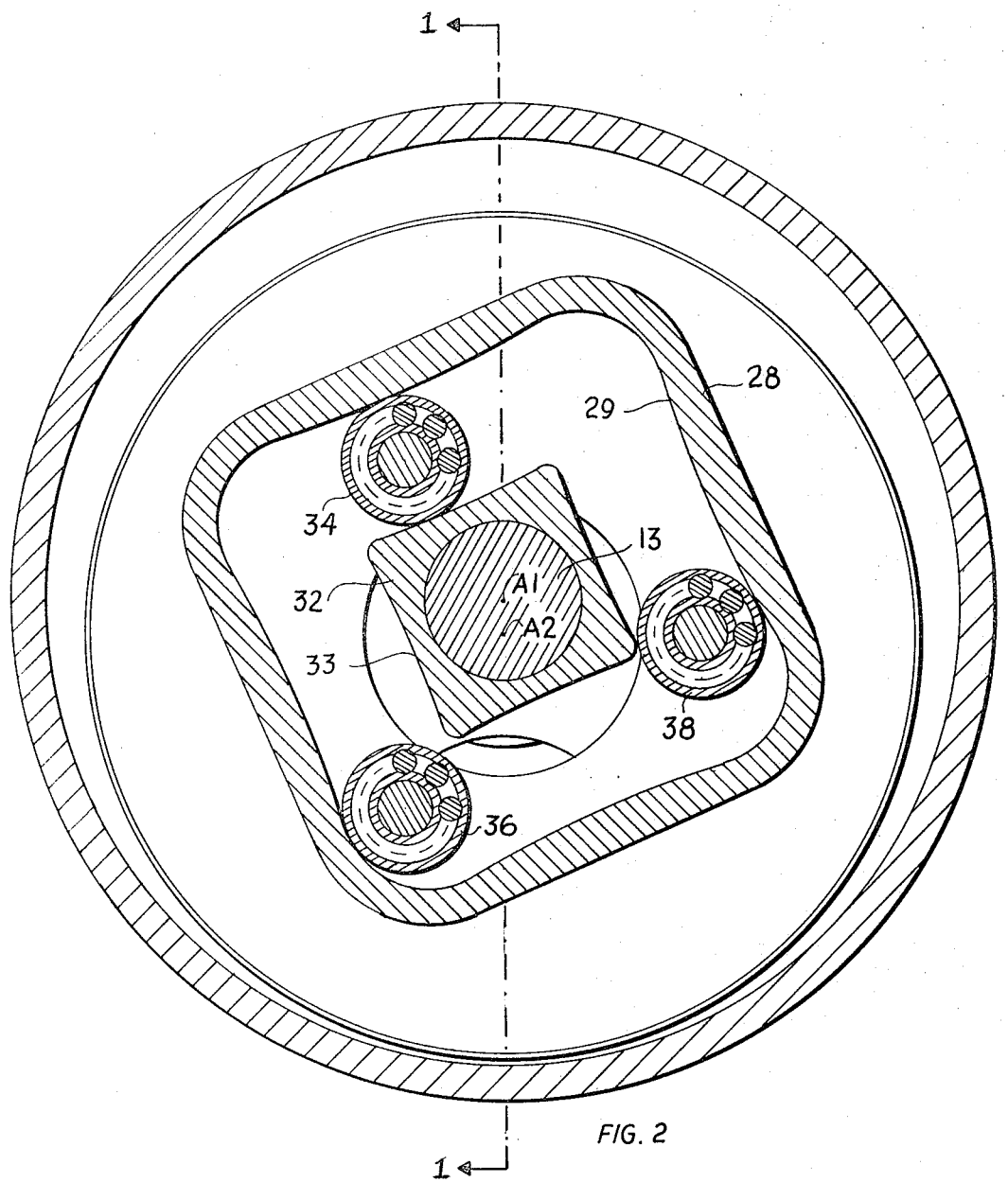
FIGURE 2 is a cross sectional view of the rotor supporting apparatus of the rotary internal combustion engine of the present invention taken along lines 2—2.
Figure 3:
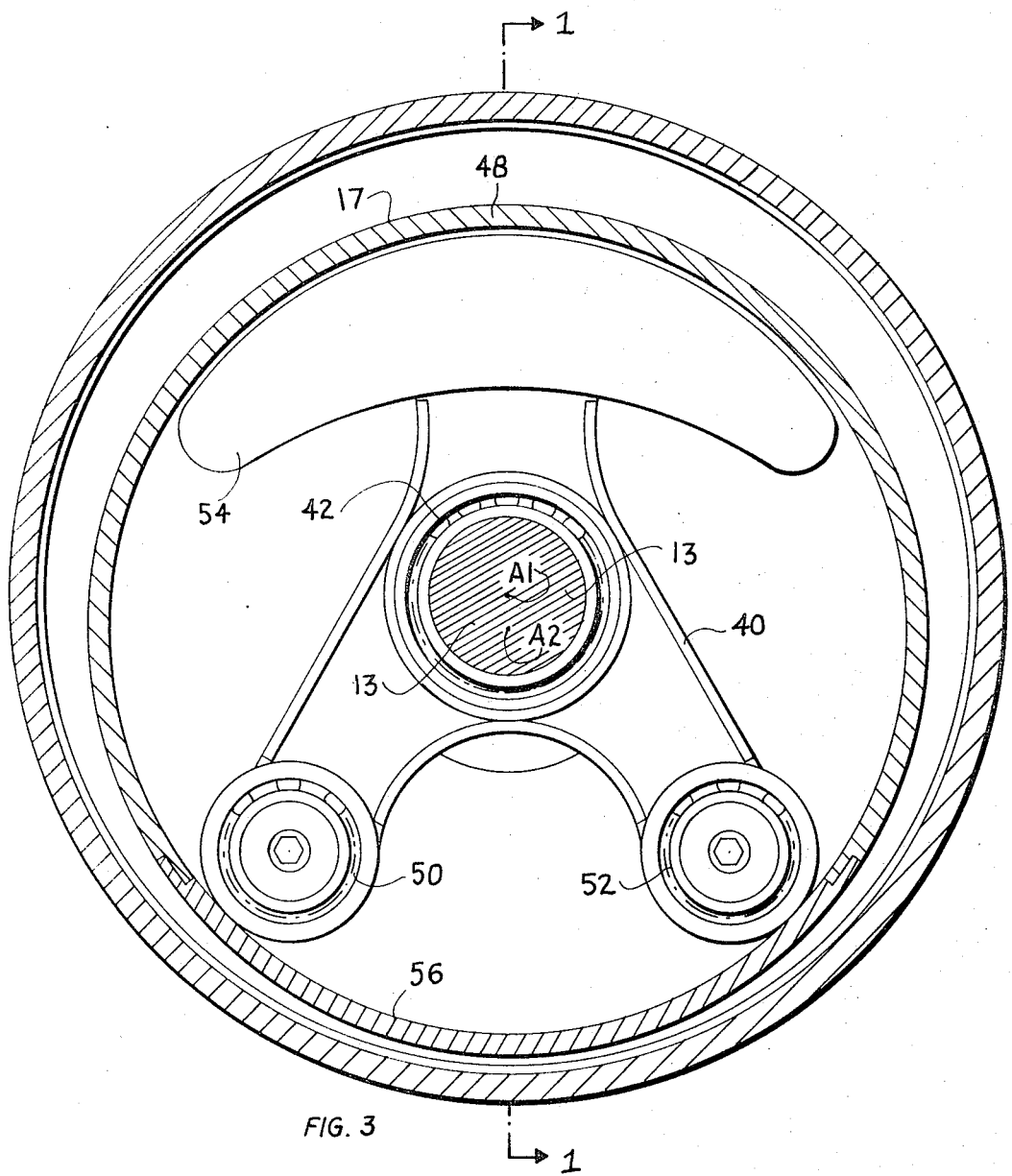
FIGURE 3 is a cross sectional view of the apparatus of FIGURE 1 taken along lines 3—3 showing the counter balance system of the present invention.

The end portions 14 and 14' each are provided with an end plate 26 at the outer ends thereof, which end plate includes an inwardly extending flange 28 whose inner surface 29 acts as a guide track. This is best shown in FIGURE 2. The inner surace 29 is similar in shape to the inner peripheral surface 30 of the rotor housing 18. However, the inner surface 29 is axially out of phase with the inner peripheral surface 30 of the rotor housing 18. The purposes for this positioning will be discussed below.

The end plate 26 has a second flange 32 within the flange 28. Flange 32 has an outer surface 33 which is similar to the inner surface 29 of flange 28 and axially aligned and in phase with the inner surface 29. Between the outer surface 33 of the flange 32 and the inner surface 29 of the flange 28, there are positioned three rotary bearings 34, 36, and 38 fixedly secured to the orbital valve plate 17 and symmetrically spaced about axis A2. Rotor 20 is fixedly secured to orbital valve plate 17. The bearings 34, 36, and 38 therefore, maintain the rotor 20 in its proper position in relation to the rotor housing 18. It should be noted at this time that the inner peripheral surface 30 of the rotor housing 18 and the surfaces 29 and 33 are square in shape with slightly rounded corners. It should also be further noted that although only the exhaust end of the engine 10 has been shown in detail with respect to the rotor bearings, it will be understood that the intake portion 14' is similar thereto.

The orbital valve plate 17 is drum-like in shape and has suspended therein a counter weight frame 40 mounted on shaft 13 by bearings 42 for free rotation about the shaft 13. Counter weight frame 40 is held in place axially on shaft 13 by suitable collars 44 and 46 on opposite sides thereof.

Counter weight frame 40 is intended to be guided within the outer lip 48 of the drum-like orbital valve plate 17 and has a pair of guide roller bearings 50 and 52 extending outwardly on the long diameter side of the frame 40. The long diameter side of the frame 40 is the side furthest from the axis A1 of the shaft 13. On the short diameter side of the frame 40 there is placed a counter weight 54 for counter balancing the combined eccentric weight of the orbital valve plate 17 and the rotor 20. The virtual center of gravity of the combined eccentric weight, by reason of the combined rotation and eccentric revolution of the rotor about its own centerline A2 and shaft axis A1 respectively, moves eccentrically about A1 at a rate three times the rotational speed of rotor 20 and in the opposite direction. Counterweight frame 40 rides within drum 17 which is attached to rotor 20 so that this eccentric motion, by revolving in the opposite direction, forces the counter weight 54 to rotate three times faster than the rotor 20. The counter balance frame 40 can be removed or placed through an access panel 56 formed on the lip 48 of the orbital valve plate 17.

Figure 4:
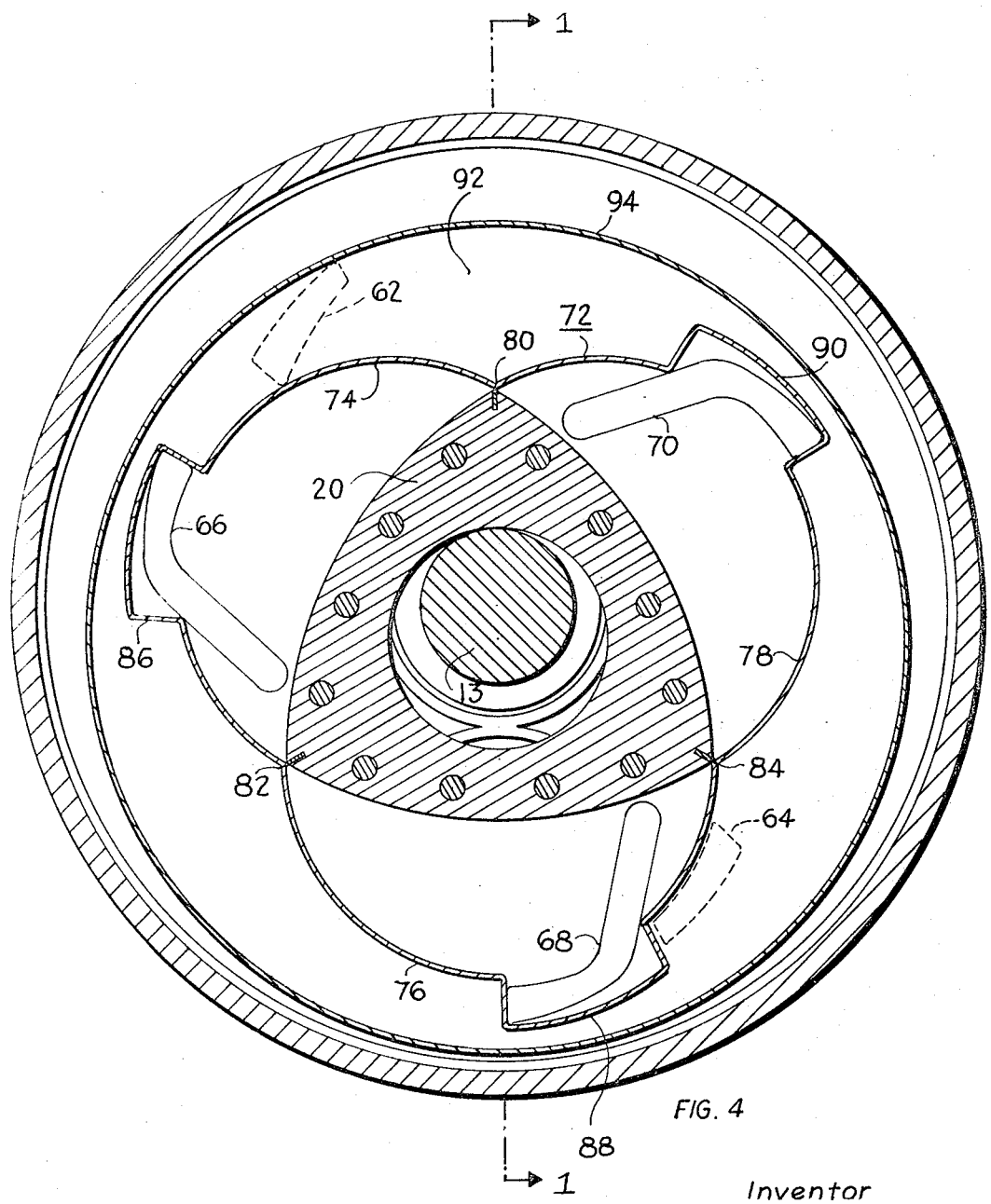
FIGURE 4 is a cross sectional view taken along lines 4—4 of FIGURE 1 showing the exhaust port and sealing strip arrangement of the orbital valve plate.
Figure 5:
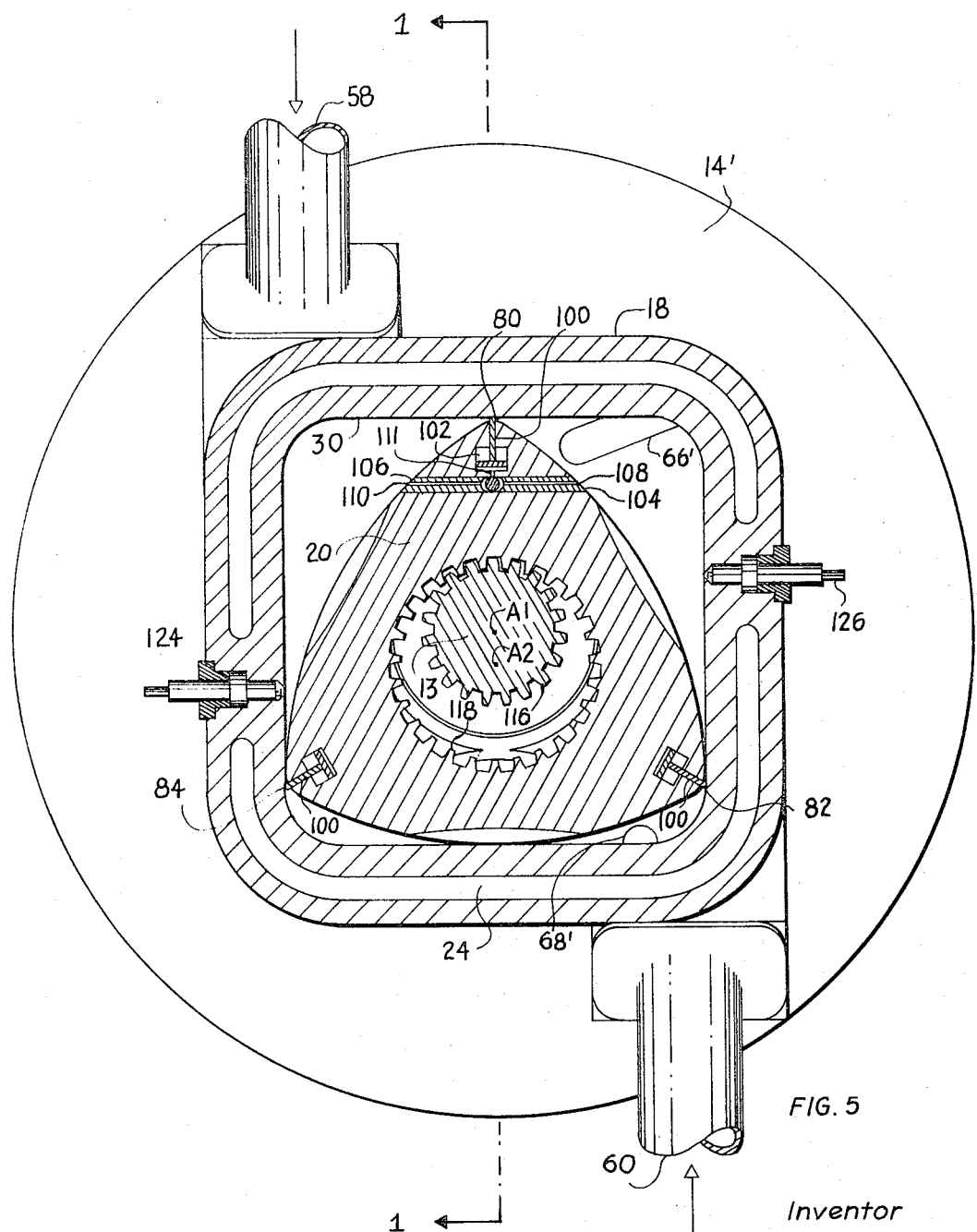
FIGURE 5 is a cross sectional view of the rotary internal combustion engine of FIGURE 1 taken along lines 5—5.

Fuel gases for the rotary internal combustion engine 10 of the present invention enter through carburetor inlet conduits 58 and 60 from a carburetor (not shown) and thence to intake ports 62' and 64' as best shown in FIGURES 4 and 6. Intake ports 62' and 64' are shown in dotted line to indicate their position with respect to the orbital valve plate 17', it being understood that the intake ports would not normally be shown in the FIGURE 6 cross section. The orbital valve plate 17' has three concave areas 66', 68', and 70', which extend from a point within the periphery 30 of the rotor housing 18 to points on the orbital valve plate 17' which will pass by intake ports 62' and 64'.

On the face of orbital valve plate 17' opposite the ports 62' and 64' there is secured a sealing strip 72' consisting of three lobes 74', 76', and 78' which lobes are arcuate in shape and are joined at apexes 80, 82 and 84 of the rotor 20. The sealing strips 72' are metal strips with an extension 86', 88' and 90' being formed respectively in the lobe seals 74', 76' and 78'. The extensions 86', 88' and 90' extend outwardly from their respective lobe sections at a point adjacent the mid point of the lobe and in line with the intake ports 62' and 64'.

On the orbital valve plate 17' outside of the periphery of the sealing strip 72' there is formed a channel 92'. On the periphery of the orbital valve plate 17' there is placed a secondary sealing strip 94'. When the gases are supplied through the inlet ports 62' and 64' to the chambers of the rotary internal combustion engine as will be discussed below, any exposed or partially exposed ports permit gas to enter the channel 92' bounded by the sealing strips 72' and 94' thus maintaining relatively even pressures about the orbital valve plate and on both sides of the sealing strip 72' so that sufficient gases are supplied to the chambers and gases are prevented from entering other parts of the rotary combustion engine by reason of the secondary sealing strip 94'. If gases were allowed to pass out of the channel 92', the lubricants for the rotary engine of the present invention might be contaminated.

In FIGURE 4, the exhaust end of the rotary internal combustion engine of the present invention is shown in detail in the same manner as the intake end shown in FIGURE 6 and discussed above. The exhaust end includes exhaust conduits 96 and 98, see FIG. 1, which receive exhaust gases through ports 62 and 64 in the flange end face of the housing 12. The orbital valve plate 17 has concave areas 66, 68 and 70 similar to the conduits of areas 66', 68', and 70' of FIGURE 6. The concave areas are bounded by sealing strips 72 in the form of lobes 74, 76 and 78 similar to the lobes 74', 76' and 78' discussed previously. The lobes 74, 76, and 78 each have extensions 86, 88, and 90 which are adapted to pass the ports 62 and 64. Also, outside of the sealing strip 72 there is provided a channel 92 bounded at its outer periphery by a secondary sealing strip 94.

The rotor 20, as stated previously, has apexes 80, 82 and 84. At these apexes, there is placed a T-shaped sealing strip 100 running parallel to the axis A1 of the shaft 13 and extending between the orbital valve plates 17 and 17'. Since the rotor 20 does not bear any weight on the rotor seals 100 against the inner peripheral surface 30 of the outer component 18, there must be provided another means for applying pressure to the seals 100 to separate the chambers defined by the outer component inner peripheral wall 30 and the inner component 20. The rotor seals 100 are T-shaped continuous strips inserted in a channel 102 adjacent the apexes 80, 82, and 84 of the rotor 20. The channels 102 allow movement of the strips 100 radially outwardly from the shaft 13. Below the channels 102 there are provided two inlet inserts 104 and 106 with small passages 108 and 110 respectively leading to the point below the channel 102 where there is an oblong opening with an axis coaxial with the inlet passages 106 and 108. Directly in the center of this last mentioned opening is another passage 111 leading to the chamber 102 below the T-shaped strips 100. A steel pressure selector ball 112 is placed in the opening. As pressure develops in one chamber with respect to another chamber, the selector ball 112 is pushed against the inlet passage of the chamber with less pressure and allows the greater pressure to enter the T-shaped seal 100's pressure chamber 102 and press the seal strip against the inner peripheral surface 30 of the rotor housing 18 while the selector ball 112 prevents pressure from leaking into the other chamber. A light spring can be utilized to normally press the T-shaped seals 100 against the inner peripheral wall when the engine is idle. Each of the seal strips 100 for the apexes 80, 82 and 84 are alike.

The shaft 13 is held in place by suitable bearings 114 provided at each end of the housing 12. The shaft 13 has an external gear 116 which meshes with an internal gear 118 within the inner component 20. The gear 118 has its center at axis A2 and revolves eccentrically about axis A1, thereby transferring the power supplied by the expansion cycle of the inner chambers to the shaft 13 so that the power may be tapped at either end of the engine 10.

In FIGURE 7, there is shown the means for effecting the distribution of spark energy at timed intervals to the chambers in the manner which has eliminated the need for special distributors or the like. The apparatus comprises two activators 120 and 122 mounted on opposite sides of the end portion 14' to be energized by the intake orbital valve plate 17'. The activators 120 and 122 are intended to supply electric power to spark plugs 124 and 126 respectively in timed intervals. Spark plugs 124 and 126 are mounted to extend into the inner peripheral surface 30 of the rotor housing 18. The activator 120 will be described in detail, it being understood that the activator 122 is exactly similar thereto. The activator 120 includes a piston 128 spring biased by reason of a spring 130 to a position wherein it will abut the eccentric valve plate 17' when valve plate 17' is at a position wherein the axis abutting the piston 128 is furthest from the axis A1. The piston therefore is moved upwardly three times during every rotation of the orbital valve plate 17'. The piston 128 is aided in its movement by means of a roller 132 which will engage the surface of the orbital valve plate 17'. The piston 128, when engaged, travels outwardly to force a metal interconnect prong 134 into contact with suitable insulated contacts 136 and 138 which cause the spark plug 124 to be energized igniting the compressed gases at the proper time. The piston is returned to its original position by the return spring 130 after the eccentric movement of the orbital valve plate has continued around on its orbit. It will easily be understood that the activators 120 and 122 can be repositioned to retard or advance the firing of the spark plugs 124 and 126.

In FIGURES 9–20, there is diagrammatically shown a working cycle of the invention as seen from the view of FIGURE 4. For purposes of clarity, applicant has superimposed the working cycle of the invention as seen from the view of FIGURE 6 on the showing of FIGURES 9–20. That is, as seen from FIGURE 6, the components have been noted by dotted lines and should be considered in timed sequence from FIGURE 20 through FIGURE 9. Further, FIGURES 9–20 as seen from the exhaust side of FIGURE 4 must be considered with the rotor moving in a clockwise direction. As seen from the view of FIGURE 6, the intake side view of FIGURES 20–9 should be considered with the rotor moving counter clockwise.

With the above considerations, the operation of the internal combustion engine 10 of the present invention is as follows:

In FIGURES 9–20, the rotor 20 within the rotor housing 18 has been shown with a simplified rotor seal 190 between chambers C1, C2, and C3.

As shown in FIGURE 9, chamber C1 has just completed its exhaust phase as seal strip extension 86 has passed exhaust port 62. As readily can be seen in FIGURE 20, any additional counter clockwise rotation of the rotor 20 would cause strip extension 90' to pass over intake port 62' thus causing gases to be taken in from the port 62' through concave channel 70' to chamber C1 position shown in FIGURES 9 and 20 is comparable to top dead center in reciprocating engines. It should be noted that chamber C2 is in the process of expansion.

In FIGURES 10 and 19, the rotor is in a position comparable to bottom dead center in reciprocating engines and has been shown after completion of the intake phase with the chamber C1 ready to compress the gases therewithin. FIGURE 19 should be noted to show that the completion of the intake phase was caused by the passing of extension 90' over the intake port 62'. FIGURE 10 and FIGURE 19 are also useful in showing that chamber C2 is two thirds of the way through its exhaust phase at port 64 as sealing strip 90 has passed two thirds of the way thereover. Further, it should be noted that chamber C3 is one third through its expansion phase.

FIGURES 11 and 18 show that after the next increment of rotation chamber C1 has continued to compress the gases and chamber C2 has begun to intake gases from the lower port 64'. Chamber C3 has nearly completed its expansion phase at this point.

In FIGURES 12 and 17, chamber C1 is shown having completed its compression stroke and the gases are being ignited by a spark plug 124 while the outer seal strip 94 or 94' indicates the eccentric position of the orbital valve plates position for activating the spark plug activator 120.

It should be noted that in FIGURES 12 and 17 the chamber C2 is intaking gases from port 64' while chamber C3 is exhausting its gases through port 62.

In FIGURES 13 and 16, chamber C1 is expanding during the power stroke while chamber C2 has begun compression. At the same time, chamber C3 has nearly completed its exhaust stroke through port 62.

In FIGURES 14 and 15, chamber C1 is shown exhausting through port 64 while chamber C2 has begun expanding. Chamber C3 has nearly completed the intake of gases from port 62' and is beginning its compression phase.

In FIGURES 15 and 14, chamber C1 is shown having completed its first four stroke cycle and is beginning its second four stroke cycle by intaking gases from the lower port 64'. Chamber C2 is exhausting its gases through port 62. It should be noted that during the exhausting phase while port 62 is partially exposed, any gases that do not escape out the port can enter the intermediate channel 92 and continue around between the seals 94 and 72 and go out the other exhaust port 64. At this stage, chamber C3 has just about completed its compression phase.

In FIGURES 16 and 13, chamber C1 is shown compressing, chamber C2 has just begun to intake gases from port 62', and chamber C3 is expanding.

In FIGURES 17 and 12, chamber C1 has completed its compression stroke and the orbital valve plate 17' has tripped the spark plug activator 122 causing spark plug 126 to ignite the gases in chamber C1. While this is occurring, chamber C2 is intaking gases from port 62' and chamber C3 is exhausting gases at port 64.

In FIGURES 18 and 11 chamber C1 is shown expanding, chamber C2 is shown compressing, and chamber C3 is exhausting at port 64.

In FIGURES 19 and 10, chamber C1 is ready to exhaust at port 62, chamber C2 is compressing its gases, and chamber C3 is intaking gases at port 64'.

At the point in FIGURES 9 and 20, the rotor 20 has returned to its starting position, having completed one full revolution, and each chamber has undergone two complete four stroke cycles.

It should be noted that by fastening the orbital valve plates 17 and 17' in the identical manner, and by fastening these plates to the rotor 20 each facing toward the center, when the rotor turns the valve plates, the seal strips exposing the ports on their respective sides are synchronized perfectly to avoid mixing of the intake and exhaust gases.

Further, it should be noted that the rotor 20 is suspended by the same number of bearing 34, 36, 38 as the number of apexes 80, 82, 84 with the bearing traveling in a fixed track relative to the polygonal shape of the inner peripheral wall 30 of the outer component 18. It should be noted that the bearings 34, 36, 38 are connected in an out of phase position to allow the firing of the chambers in approximately a dead center position thus utilizing the maximum movement along the outer surface of the flange 32 during the expansion cycle of the chamber. By suspending the rotor 20 on the end walls 26 the shaping of the outer peripheral wall of the inner component or rotor 20 within the maximum area permits the passage of gases from one lobe to another when the chambers are in the minimum area of compression and further creates the most effective turbulence of the gases when igniting the gases by a spark plug, or igniting the gases through the use of fuel ejection.

Figure 21:
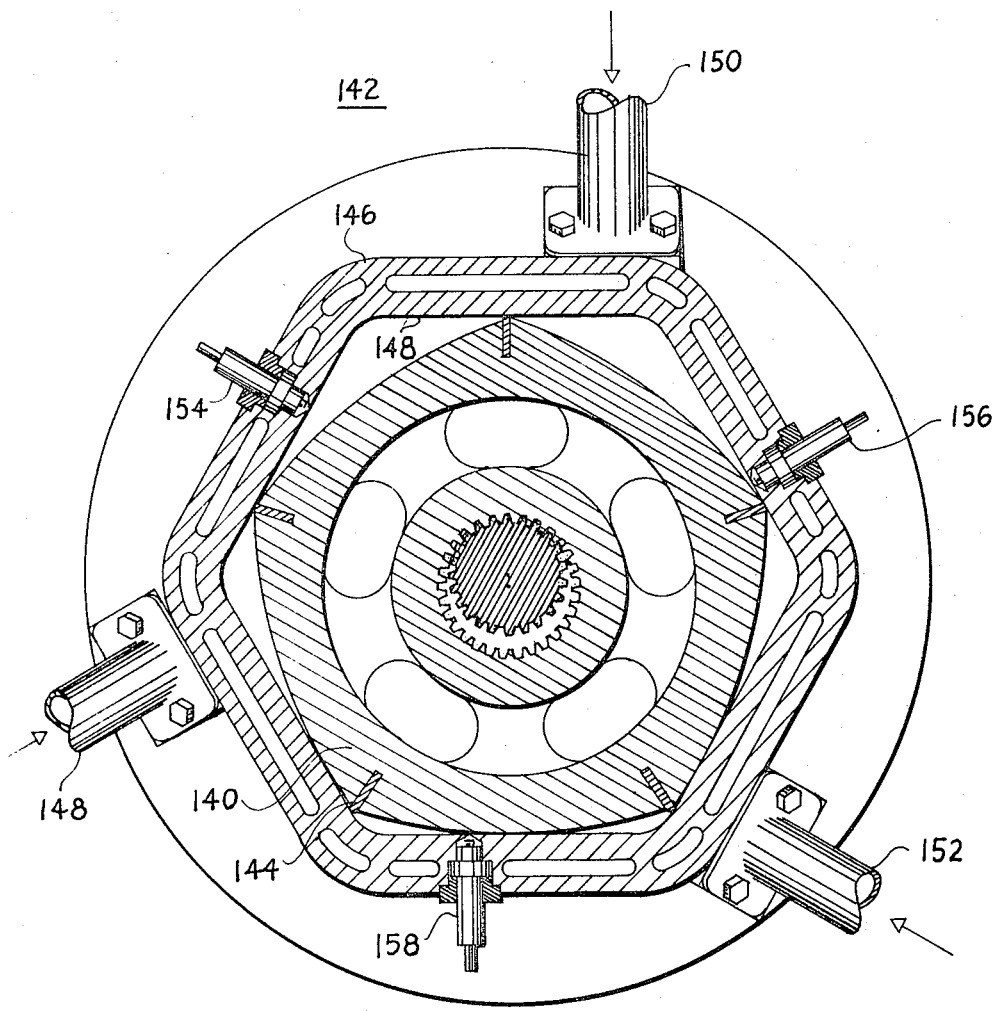
FIGURE 21 is a cross sectional view of a second type of rotary internal combustion engine similar to the showing of FIGURE 5.

In FIGURE 21, there is shown a second embodiment of the present invention in which the rotor or inner component 140 of a rotary internal combustion engine 142 is five sided and has five sealing strips 144 sealing off chambers within an outer component 146 having a six sided inner peripheral wall 148. The rotary internal combustion engine 142 has three symmetrically spaced inlet conduits 148, 150, and 152, three spark plugs 154, 156, and 158 symmetrically positioned about the inner peripheral surface 148 and three exhaust conduits (not shown). The operation of the rotary internal combustion engine 142 is similar to the rotary internal combustion engine 10 of FIGURES 1–20, except that there are three four stroke cycles for each of the five chambers during one revolution of the rotor 140 as opposed to only two four stroke cycles in each chamber for each revolution of the rotor 20. It thus can be seen that the number of four stroke cycles per revolution is equal to the number of spark plugs or ignition means times the number of chambers.

In FIGURE 22, there is shown a cross sectional view of a rotary internal combustion engine 160 similar to the rotary internal combustion engine 10 except for a variation in the counter balance for the eccentric rotor and orbital valve plate.

The rotary internal combustion engine 160 includes a rotor 162 whose axis B1 is eccentric to the axis B2 of the shaft 164 centrally disposed within the outer housing 166. The housing 166 has a substantially square inner peripheral surface 168 within which the rotor 162 rotates, the rotor having three apexes 170, 172, and 174. An orbital valve plate 176 is mounted for rotation with the rotor 162. However, the orbital valve plate 176 has three weights 178, 180, and 182 symmetrically positioned about the periphery thereof and spaced intermediate the apexes 170, 172, and 174 so that as can be seen in FIGURES 23–25 the counter weights 178, 180 and 182 always counter balance the eccentric weight of the rotor 162 and the orbital valve plate 176.

Figure 26:
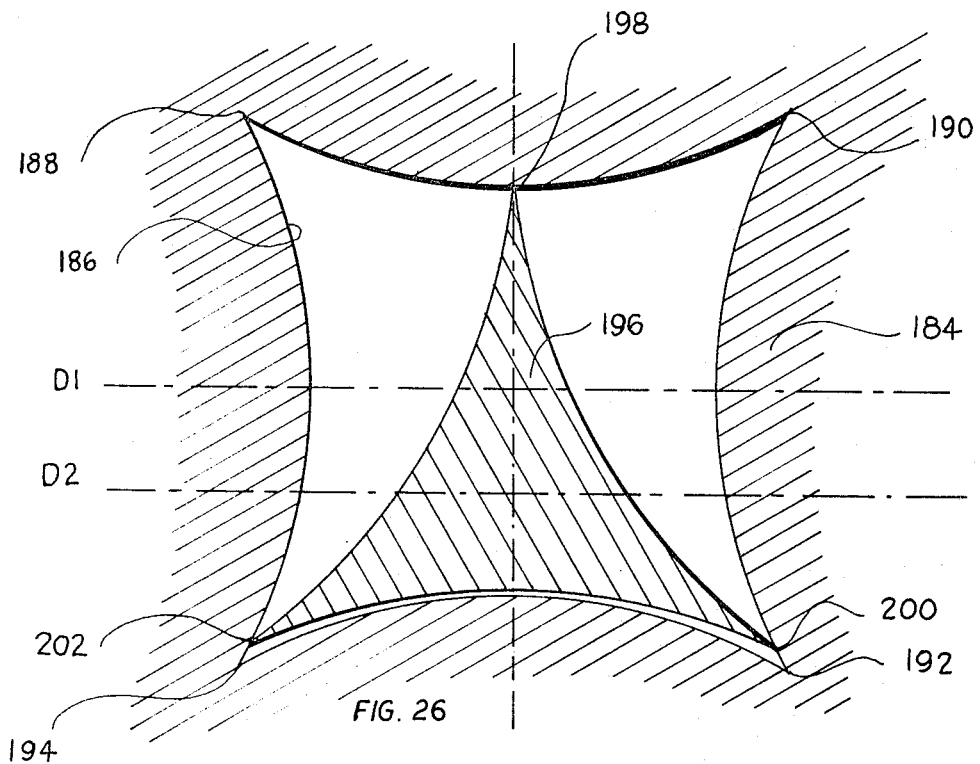
FIGURE 26 is a schematic showing in cross section of still another embodiment of the present invention.

In FIGURE 26, there is shown still another embodiment of the present invention in which there is utilized an outer component 184 having an inner peripheral surface 186 consisting of four concave sides thus providing four apex points 188, 190, 192, and 194. The outer component 184 has a central axis D1 while the inner component or rotor 196 has an axis D2 eccentric with and parallel to the axis D1. The inner component 196 has three sides each of which is concave and has three apexes 198, 200, and 202. This configuration provides chambers with a greater volume and thus a higher compression ratio while still having the two four stroke cycles per chamber of the apparatus of FIGURES 1–20.

Figure 27:
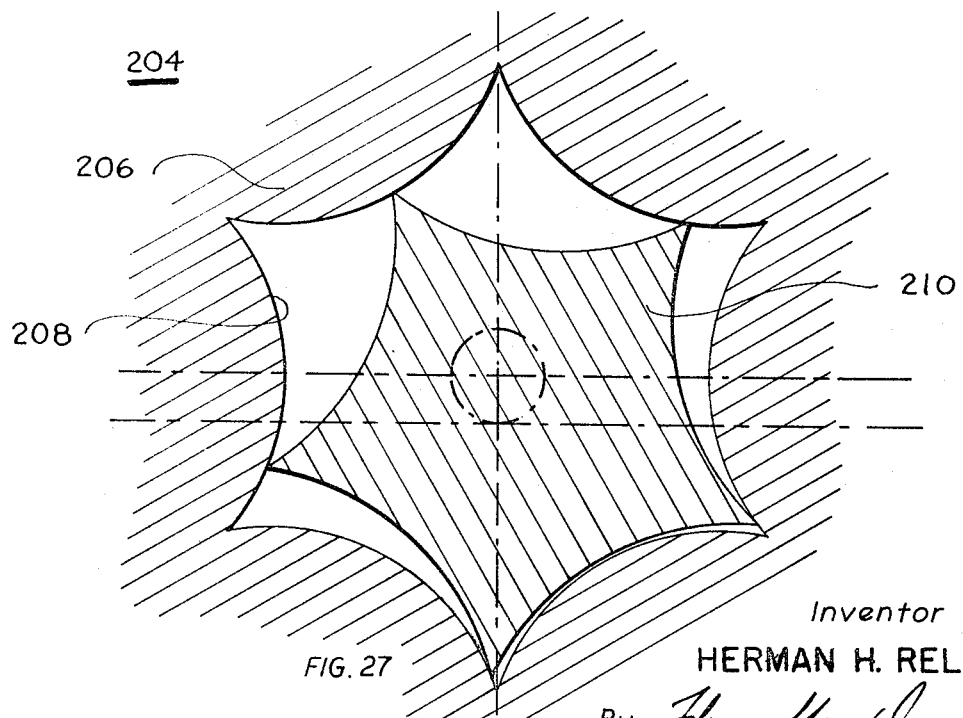
FIGURE 27 is a diagrammatic showing of a further embodiment of the present invention.

In FIGURE 27, there is shown still another embodiment of the present invention generally designated by the numeral 204 and comprising an outer component 206 having an inner peripheral surface 208 which is hexagonal with six convex sides, and an inner component 210 which is five sided and provided with concave surfaces in a manner whereby the inner component is eccentric to the outer component.

Figure 28:
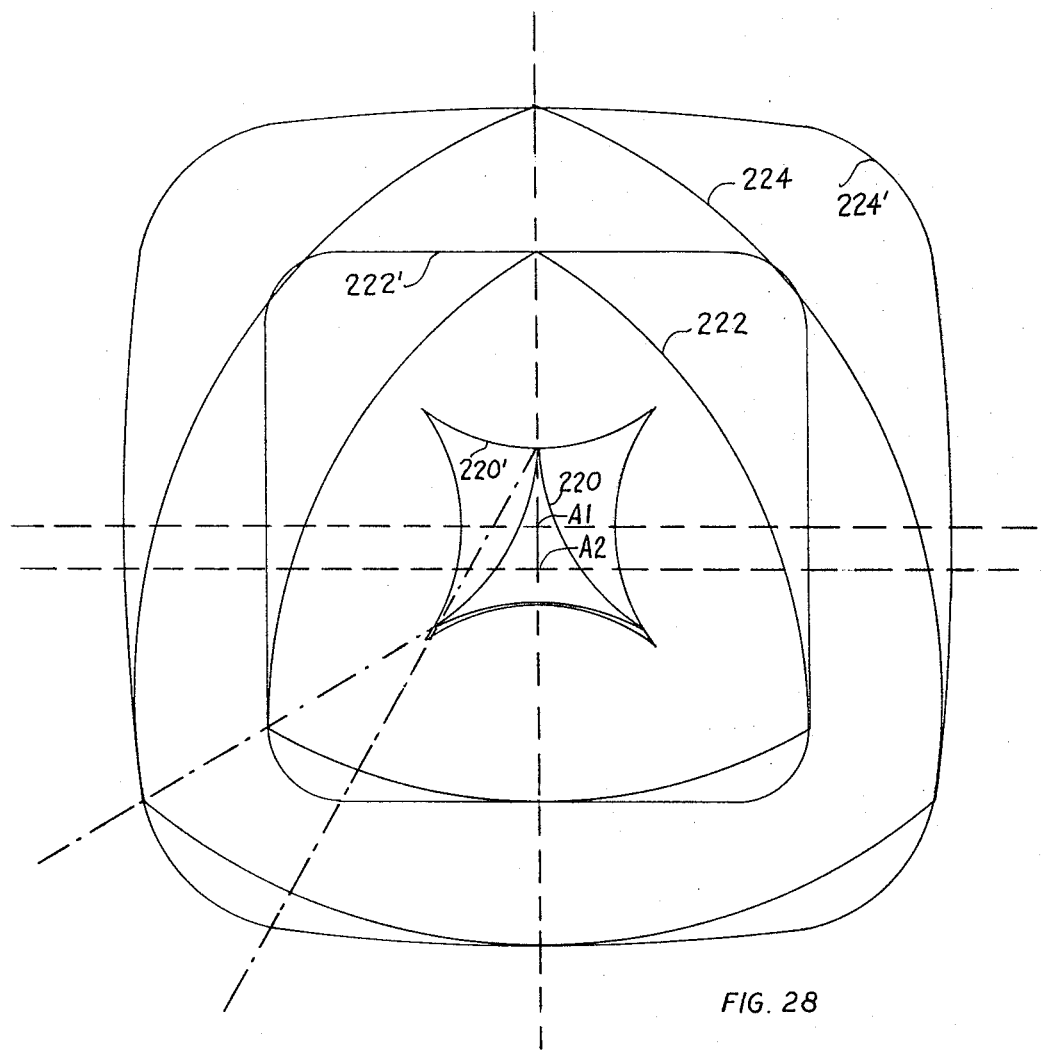
FIGURE 28 is a diagrammatic showing of the many shapes for the rotor and rotor housing that may be utilized in accordance with the principles of the present invention.

FIGURE 28 is a diagrammatic showing of the many shapes for the rotor and rotor housing that may be utilized in accordance with the principles of the present invention.

As has been stated previously, and shown in FIGURE 46, a rotor 220 can be provided for rotation about axis A2 within a rotor housing whose inner peripheral surface 220' is symmetrical about the axis A1 and consists of four sides each being convex.

Still utilizing a three sided rotor, a second rotor 222 is shown having its three sides convex, and adapted to rotate about axis A2 eccentric of and parallel to axis A1. Rotor 222 is positioned within the inner peripheral wall 222' of a rotor housing which is forecited and square in shape symmetrical about axis A1. The forecited rotor housing inner peripheral wall 222' has round corners and is similar to the embodiment of the present invention as shown in FIGURES 1–20.

Finally, there is shown the rotor 224 similar to rotor 222 in that it has three convex sides and is adapted to be rotated about axis A2 eccentric of and parallel to the axis A1 of the inner peripheral wall 224' of a rotor housing. The inner peripheral wall 224' consists of four concave sides joined with slightly rounded corners.

From the above considerations, as shown in FIGURE 28, the present invention is not limited to any particular configuration of the rotor or the inner peripheral surface of the rotor housing. Rather, variation in the sides varies the compression ratio of the rotary internal combustion engine of the present invention.

The present invention may be embodied in other specific forms without departing from the spirit or essential attributes thereof, and, accordingly, reference should be made to the appended claims rather than to the foregoing specifications as indicating the scope of the invention.

I claim as my invention:

1. A rotary internal combustion engine having a cycle which includes the four phases of intake, compression, expansion and exhaust; said engine comprising an outer body having a cavity symmetrically disposed about an axis, said outer body cavity being defined by the inner surface of a peripheral wall having an even number of symmetrically spaced side walls positioned circumferentially about said axis, and inner body received within said outer body cavity and supported for relative rotation with respect to said outer body, the axis of said inner body being laterally spaced from but parallel to the axis of said outer body, said inner body being mounted for rotation about the axis of said outer body, said inner body having symmetrically disposed side walls with surfaces facing said outer body inner surface, said inner body side walls being one less in number than said outer body side walls, said inner body side walls being joined along apexes, each of said apexes having its radially outermost edge disposed substantially at said outer body peripheral wall inner surface in all relative positions of said inner and outer bodies, said apexes having continuous sealing engagement with said outer body peripheral wall inner surface such that the space between the facing surfaces of said inner and outer bodies define a plurality of working chambers which individually vary in volume upon relative rotation of the inner body with respect to the outer body, each portion of the outer surface of the inner body between a pair of adjacent apexes being such that the adjacent working chamber extends from one of said apexes to the other in all relative positions of the two bodies, inlet ports adjacent one end of said working chambers, said inlet ports being equal in number to one half the sides of said outer body side walls, said inlet ports being symmetrically disposed with respect to the axis of said outer body cavity, valve means associated with said inlet ports for individually connecting each of said inlet ports to each of said working chambers once during each revolution of said inner body, exhaust ports positioned adjacent the other end of said working chambers, said exhaust ports being equal in number to said inlet ports, said exhaust ports being symmetrically disposed about the axis of said outer body cavity and out of phase with the piston of said inlet ports, exhaust valve means associated with said exhaust ports for connecting each of said exhaust ports to each of said working chambers once during each revolution of said inner body, expansion initiation means, said expansion initiation means being mounted in said cavity, said expansion initiation means being positioned at a number of points equal to said number of exhaust ports, said expansion initiation means being symmetrically spaced about said cavity out of phase with respect to said inlet ports and said exhaust ports, and timing means associated with said expansion initiation means for operating each of said expansion initiation means once for each of said working chambers during each revolution of said inner body.

2. The rotary internal combustion engine of claim 1 wherein said expansion initiation means is a sparking device mounted in the inner peripherial wall of said outer body, said timing means being operative from one of said valve means.

3. The rotary internal combustion engine of claim 2 wherein said timing means includes a mechanical sensing device, said mechanical sensing device being operative upon rotation of said inner body, said mechanical sensing means bein sensitive to the relative axial position of said inner body to supply electric power to said spark plugs.

4. The apparatus of claim 1 wherein said inlet ports and said exhaust ports are formed respectively on opposite end faces of said outer body, said first valve means including a valve plate facing said one end face of said outer body and controlling the flow of working fluids from said inlet port into said working chambers, said exhaust valve means including a second valve plate facing said other end face and controlling the connection of said working chambers to said exhaust ports, said first and second valve plates being mounted for rotation with said inner body.

5. The rotary internal combustion engine of claim 4 wherein said inner body includes seal strips extending radially outwardly from the center of said inner body at said apexes and extending the length of said inner body, said inner body having a cavity below said seal strips, gas passages extending between adjacent working chambers on opposite sides of a given apex, said gas passages being connected to said cavity behind said seal strip, valve means for feeding gases from the chamber with the highest pressure to said seal strip cavity to force said seal strip cavity into sealing arrangement with respect to the inner peripheral surface of said outer body.

6. A rotary internal combustion engine having a cycle including the four strokes of intake, compression, expansion and exhaust and comprising an outer hollow body and an inner body supported for revolving eccentric rotation within the outer body, said inner body turning on an axis eccentric of and parallel to the axis of the outer body, said bodies having respective facing surfaces defining a plurality of variable volume working chambers, said facing surfaces comprising the outer surface of the inner body and the inner surface of the outer body, said inner body having a plurality of apexes defining said inner body facing surfaces, said outer body having one more facing surface than said inner body, said inner surface apex portion being spaced circumferentially about the axis of the inner body, said apexes including edges parallel to the axis of the inner body engaging the inner surface of the outer body, intake means symmetrically spaced with respect to said inner and outer bodies, exhaust means symmetrically spaced about said working chambers, said intake means being arranged to communicate with said variable volume working chambers to consecutively feed all of said chambers a number of times during one revolution equal to one half the number of facing surfaces of said outer body, said exhaust means also being arranged to communicate with said working chambers, said exhaust means being operative to exhaust said working chambers a number of times equal to one half the number of facing surfaces of said outer body, said bodies being arranged to rotate relative to one another in a manner so that the cycle of operation of the engine is determined by the relative movement of the inner body with respect to the outer body, a shaft coaxial with said outer body, first support means for supporting said shaft coaxially with said outer body, second support means for supporting said inner body on said outer body, means interconnecting said shaft with said inner body for rotation therewith; said second support means including a guide track having an outer portion similar in shape to said outer body facing surfaces and an inner portion similar to and aligned with the guide surface of said outer portion, and guide rollers operatively received between said inner and outer portions and symmetrically spaced with respect to the axis of said inner body, said rollers being equal in number to said inner body apexes.

7. The rotary internal combustion engine as claimed in claim 6 wherein said guide track and rollers are oriented arcuately out of phase with the configurations of said inner surface of said outer body.

8. A rotary internal combustion engine having a cycle including the four strokes of intake, compression, expansion and exhaust and comprising an outer hollow body and an inner body supported for revolving eccentric rotation within the outer body, said inner body turning on an axis eccentric of and parallel to the axis of the outer body, said bodies having respective facing surfaces defining a plurality of variable volume working chambers, said facing surfaces comprising the outer surface of the inner body and the inner surface of the outer body, said inner body having a plurality of apexes defining said inner body facing surfaces, said outer body having one more facing surface than said inner body, said inner surface apex portion being spaced circumferentially about the axis of the inner body, said apexes including edges parallel to the axis of the inner body engaging the inner surface of the outer body, intake means symmetrically spaced with respect to said inner and outer bodies, exhaust means symmetrically spaced about said working chambers, and axially displaced from said intake means, said intake means being arranged to communicate with said variable volume working chambers to consecutively feed all of said chambers a number of times during one revolution equal to one half the number of facing surfaces of said outer body, said exhaust means also being arranged to communicate with said working chambers, said exhaust means being operative to exhaust said working chambers a number of times equal to one half the number of facing surfaces of said outer body, said bodies being arranged to rotate relative to one another in a manner so that the cycle of operation of the engine is determined by the relative movement of the inner body with respect to the outer body, and counterbalance means at each end of said inner body, said counterbalance means including a counterbalance frame freely mounted for rotation about the axis of said outer body, said counterbalance frame including means for maintaining a weight on the side of said inner body closest to the axis of said outer body, said counterbalance means being operative to counterbalance the eccentric motion of said inner body with respect to said outer body.

9. A rotary internal combustion engine having a cycle which includes the four phases of intake, compression, expansion and exhaust, said engine comprising an outer body and an inner body, said outer body having a cavity within which said inner body rotates, said outer body cavity having a first axis, said inner body having a second axis eccentric to and parallel to said first axis, said outer body cavity having an inner surface, said inner body having a number of symmetrical sides joined at apex edges parallel to said second axis, said outer body inner surface having a symmetrical number of sides one more in number than said apex edges, said inner body apex edges being disposed adjacent to and in sealing engagement with said outer body inner surface, said inner body being mounted for rotation about a shaft, said shaft being in continuous sealing engagement with said outer body inner surface such that the space between the facing surface of said inner and outer bodies is divided into a plurality of working chambers equal in number to said apexes, said working chambers individually varying in volume upon relative rotation of the inner body with respect to the outer body, each portion of the outer surface of the inner body between a pair of adjacent apex portions being such that the adjacent working chamber extends from one of said apex portions to the other in all relative positions of the two bodies, first valve means operative to individually feed a charge of working fluid into each of said chambers in timed relationship with respect to the rotation of said inner body relative to said outer body, second valve means displaced from said first valve means and operative to exhaust said working chambers in timed relationship in accordance with the relative rotation of said inner body and said outer body, at least one of said first and second valve means comprising an orbital valve plate rotatable with said inner body and having one end facing one end wall of said outer body, said one end wall having a first intake port therethrough, said first intake port being connected to a supply of working fluid for said chambers, said valve plate being operative to connect said first intake port to at least one of said working chambers during a single rotation of said inner body, said orbital valve plate including sealing means on said one end face, said sealing means being operative to connect said port to one of said working chambers only during a portion of the rotation of said orbital valve plate, said sealing means being operative to prevent communication between said port and said working chambers during the remainder of the rotation of said orbital valve plate, a second intake port on said end wall spaced from said first intake port, said orbital valve plate including a second passage for connecting said second intake port to one of said working chambers when said second passage is aligned with said second port, said sealing means being operative to allow working fluid to pass from said second port through said second passage to one of said working chambers during a first portion of the rotation of said orbital valve plate, said sealing means being operative to prevent said working fluid from passing through said second port to said second passage during the remainder of a revolution of said orbital valve plate; and wherein said sealing means includes a sealing ring enclosing said first and second passages on said orbital valve plate and said outer body cavity, and a second sealing ring surrounding said first sealing ring, said second sealing ring being mounted on said orbital valve plate, said orbital valve plate having a channel therein between said first and second sealing rings, said channel allowing communication between said first and second intake ports.

10. The apparatus of claim 9 wherein said orbital valve plate has passages symmetrically spaced about and equal in number to the number of apex edges of said inner body, said first sealing means extending between adjacent apex edges and preventing the passage of gases from one working chamber to another working chamber, said intake passages being symmetrically disposed about said outer body end face, said intake passages being equal in number to one half of the number of sides of said outer body inner peripheral surface.

References Cited

UNITED STATES PATENTS

| | | |
|---|---|---|
| 1,642,996 | 9/1927 | Johnson. |
| 2,162,771 | 6/1939 | Winans. |
| 2,489,326 | 11/1949 | Rockstrom et al. |
| 2,947,290 | 8/1960 | Froede _____ 123—8 |
| 2,988,065 | 6/1961 | Wankel et al. _____ 123—8 |
| 2,994,277 | 8/1961 | Merritt. |
| 3,108,578 | 10/1963 | Scherenberg _____ 123—8 X |
| 3,199,496 | 10/1965 | Kell _____ 123—8 |
| 3,224,421 | 12/1965 | Peras _____ 123—8 |

FOREIGN PATENTS

| | | |
|---|---|---|
| 1,291,364 | 3/1962 | France. |
| 1,306,418 | 6/1962 | France. |
| 1,311,740 | 10/1962 | France. |
| 24,559 | A.D. 1908 | Great Britain. |

OTHER REFERENCES

Publication, Wankel et al., Bauart und gegenwartiger Entwicklungsstand einer Trochoiden-Rotationskolbenmaschine, pages 33–45, February 1960.

MARK NEWMAN, *Primary Examiner*.

F. T. SADLER, R. D. BLAKESLEE,
*Assistant Examiners.*